No. 761,030. PATENTED MAY 24, 1904.
T. J. BROWNING.
HOOK.
APPLICATION FILED MAY 25, 1900. RENEWED FEB. 7, 1901.
NO MODEL.
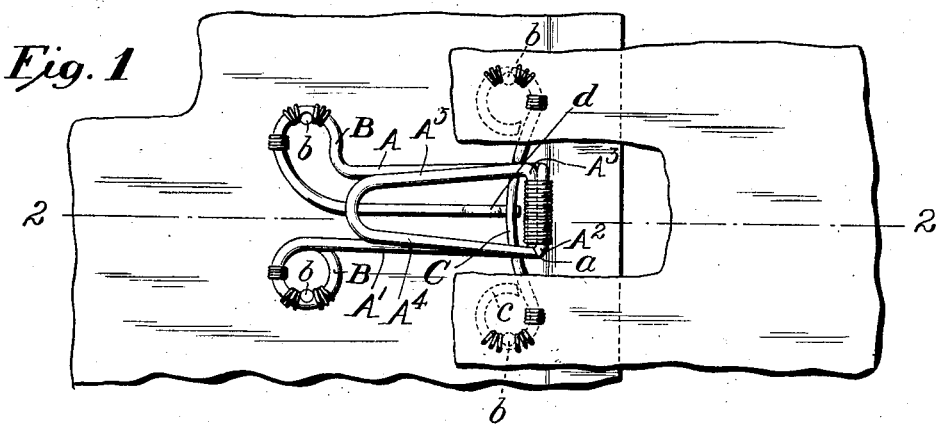
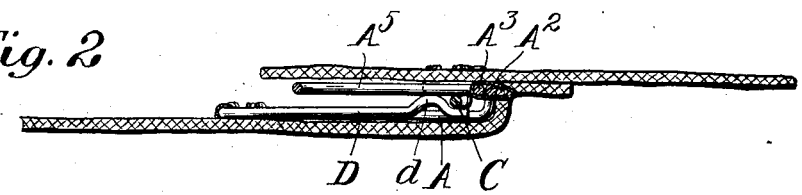
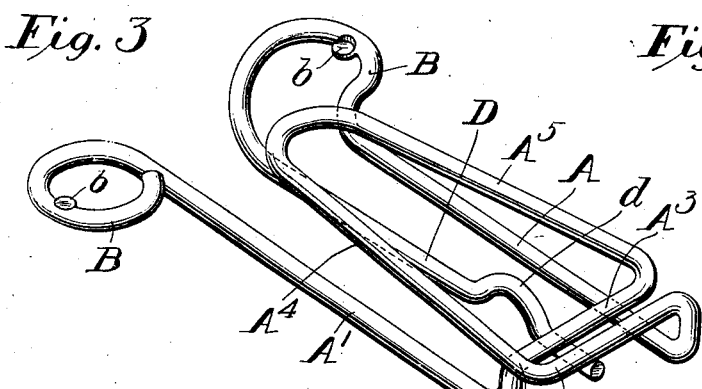
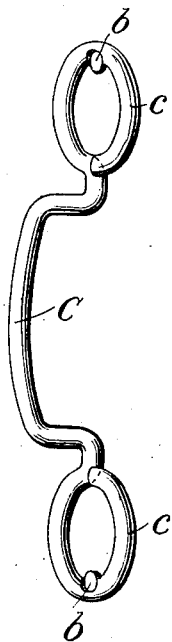
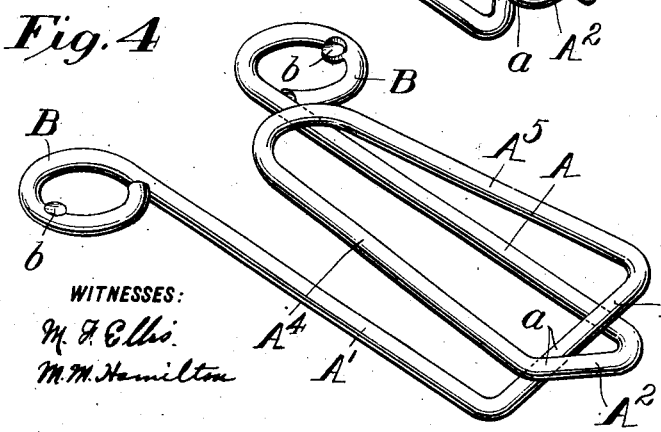
WITNESSES:
M. F. Ellis
M. M. Hamilton
INVENTOR
Tillie J Browning
BY
Harding & Harding
ATTORNEYS No. 761,030. Patented May 24, 1904.

UNITED STATES PATENT OFFICE.

TILLIE J. BROWNING, OF PHILADELPHIA, PENNSYLVANIA.

HOOK.

SPECIFICATION forming part of Letters Patent No. 761,030, dated May 24, 1904.

Application filed May 25, 1900. Renewed February 7, 1901. Serial No. 46,300. (No model.)

*To all whom it may concern:*

Be it known that I, TILLIE J. BROWNING, a citizen of the United States, residing at Philadelphia, county of Philadelphia, and State of Pennsylvania, have invented a new and useful Improvement in Hooks, of which the following is a full, clear, and exact description, reference being had to the accompanying drawings, which form a part of this specification.

The objects of my invention are to produce a hook which will obviate the objections which, to a greater or less extent, attach to hooks heretofore in common use or known to the art. Among these objections may be cited the lack of invisibility of the hook when it is actually in use and engaged with the eye, especially where the hook is sewed close to the edge of the garment; the tendency of the eye to cut the thread by which the front end of the hook is secured; the tendency of this thread to slip upon the shank of the hook; the lack of capacity for an automatic spring engagement between the hook and eye, necessitating the provision of a tongue having a hump or swell; the lack of rigidity in and general weakness of the fastening connection of the front end of the hook with the garment, and the difficulty or awkwardness of sewing the thread around the front of the hook. In my improved construction these difficulties are altogether obviated by bending the wire forming the shank transversely across the hook in both directions, the bends extending from one side of the hook to the other and intersecting, as will hereinafter be fully described and explained.

I do not intend to limit myself to any particular form of or manner of forming the transverse bends or the intersections, as the same may be varied from the two specific forms (themselves specifically quite different one from the other) shown in the drawings and hereinafter described.

I will now describe the specific embodiments of my invention illustrated in the accompanying drawings, in which—

Figure 1 is a plan view of my improved hook and eye attached to a portion of a garment. Fig. 2 is a section on the line 2 2 of Fig. 1. Fig. 3 is a perspective view of the hook. Fig. 4 is a similar view of a modified form of hook. Fig. 5 is a perspective view of the eye of Fig. 1.

A A' are the shank-wires of the hook. The wire forming shank A is bent inwardly, so as to pass from the front portion of the shank A to a point above the front portion of the shank A', forming the transverse bend $A^2$, and is thence bent backwardly to form one of the bill-wires $A^4$ of the hook. The wire forming shank A' is bent inwardly, so as to pass from the front portion of the shank A' to a point above the front portion of shank A, forming the transverse bend $A^3$, and is thence bent backwardly to form the other bill-wire $A^5$ of the hook. This construction causes the two wires to cross each other at the front of the hook, (see a, Figs. 3 and 4,) and the thread for securing the hook to the garment is passed, preferably, around both of the transverse bends $A^2$ $A^3$. The wires may be bent successively upwardly, inwardly, and at substantially right angles to the corresponding shank portions to form the fastening end of the hook, as in Figs. 1, 2, and 3, or the wires may be bent inwardly and upwardly at substantially right angles to the corresponding shank portions, but so as to cross diagonally, as in Fig. 4.

At the rear of the hook the wires of the shanks A and A' are bent to form the loops B. Each of these loops has a projecting portion b. The thread passes over the metal of the loops B on each side of this projection, and the thread is prevented from movement upon the loops or the loops upon the thread by reason of this projection. The loops c of the eye C may be provided with similar projections b for the same purpose.

A tongue D, having the common hump or swell d, is shown in the form of hook illustrated in Figs. 1, 2, and 3, while in the form illustrated in Fig. 4 the tongue and its hump are omitted. Any form of eye may be employed, the one shown being particularly suitable in certain situations for use in connection with my improved hook. By this improved construction I obviate many of the defects of hooks of the prior art.

In my improved hook the goods are brought by the stitches around the front of the hook up above the level of the shank. The hook is therefore more or less hidden from view while in engagement with the eye. This invisibility is absolute with my preferred construction, even where there is a very small margin of the garment between the hook and the garment's edge, for the reason that the section of garment to which the hook is attached is brought by the stitches up to the level of the bill, and the section of garment to which the eye is attached lies flat against the section to which the hook is attached when the two sections are hooked together, thus altogether preventing any gaping between the sections and rendering the hook, as stated, invisible. The wires being bent transversely from the shank and thence backwardly instead of being bent merely backwardly, as in hooks in common use, the two wire parts $A^4$ $A^2$ A and $A^5$ $A^3$ A' are slightly expanded during the slipping into place of the eye by reason of the eye pressing the two bill-wires $A^4$ $A^5$ inwardly toward each other and spring again to their normal positions when the eye is in place, thus giving the hook sufficient resiliency to enable the hump or swell $d$ to be altogether dispensed with.

In hooks as usually constructed the securing-thread is passed around under the bill of the hook. This is somewhat difficult to do, and at times the thread does not catch properly, causing a loss of time. With my improved hook the thread at the engaging end may be secured rapidly and with certainty. Then, too, in the ordinary hook the thread is liable to slip back along the shank-wires. This obviously cannot occur with my improved hook. Again, in the ordinary hook the position of the thread is such that it contacts with the eye, tending to cut the thread. In my preferred construction, Figs. 1, 2, and 3, this is altogether obviated by reason of the fact that the thread is substantially on a level with the bill of the hook and the resting-place of the eye is not against the thread, and even in the construction of Fig. 4 the tendency to cutting of the thread is lessened by the fact that the thread is held firmly at the front of the hook and cannot slip back and forth on the shank.

The wide bearing provided for the stitches, particularly in my preferred hook, gives great strength at the point of greatest strain, and the front of the hook is held rigidly in position.

Having now fully described my invention, what I claim, and desire to protect by Letters Patent, is—

1. As a new article of manufacture, a hook for garments in which the wires forming the same are at the fastening end provided with transverse bends which extend substantially from each side of the hook to the other side, said transverse bends intersecting each other and forming the hook proper.

2. As a new article of manufacture, a hook for garments in which the wires forming the shank portions are provided at the fastening end of the hook with transverse bends which extend substantially from each shank portion to the other shank portion, said transverse bends intersecting each other and forming the hook proper.

3. As a new article of manufacture, a hook for garments in which the wires forming the same are at the engaging end provided with transverse bends at substantially right angles to the corresponding shank portions and which extend substantially from each shank portion to the other shank portion and form the hook proper.

4. As a new article of manufacture, a hook for garments in which the wires forming the shank are bent successively upwardly, inwardly and at substantially right angles to the corresponding shank portions to form the fastening end of the hook.

5. As a new article of manufacture, a hook for garments in which the wires forming the shank are bent upwardly, and inwardly at substantially right angles to the corresponding shank portions to form the fastening end of the hook.

6. As a new article of manufacture, a hook for garments in which each wire forming the shanks is bent, from the front of one shank, upwardly and inwardly to a point above the front portion of the other shank, and thence backwardly to form one side of the bill, said bends intersecting each other.

In testimony of which invention I have hereunto set my hand at Philadelphia on this 17th day of May, 1900.

TILLIE J. BROWNING.

Witnesses:
M. F. ELLIS,
J. M. SHINDLER, Jr.